US010650092B2

(12) United States Patent
Han et al.

(10) Patent No.: US 10,650,092 B2
(45) Date of Patent: *May 12, 2020

(54) THREE-DIMENSIONAL MULTI-VECTOR TABLES

(71) Applicant: International Business Machines Corporation, Armonk, NY (US)

(72) Inventors: Tian Qi Han, Shanghai (CN); Dong Ni, Shanghai (CN); Hua Hong Wang, Shanghai (CN); Hao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,113

(22) Filed: Nov. 19, 2019

(65) Prior Publication Data

US 2020/0089748 A1    Mar. 19, 2020

Related U.S. Application Data

(63) Continuation of application No. 16/451,111, filed on Jun. 25, 2019, which is a continuation of application
(Continued)

(51) Int. Cl.
*G06F 17/24* (2006.01)
*G06T 15/10* (2011.01)
(Continued)

(52) U.S. Cl.
CPC .......... *G06F 17/245* (2013.01); *G06F 3/0482* (2013.01); *G06F 3/04845* (2013.01);
(Continued)

(58) Field of Classification Search
None
See application file for complete search history.

(56) References Cited

U.S. PATENT DOCUMENTS 5,767,854 A * 6/1998 Anwar ................. G06F 3/0481
715/848
7,146,562 B2    12/2006 Janssen
(Continued)

OTHER PUBLICATIONS

Liu, Zhengxi, U.S. Appl. No. 15/849,757, Office Action dated Mar. 21, 2019, 36 pgs.
(Continued)

*Primary Examiner* — Zhengxi Liu
(74) *Attorney, Agent, or Firm* — William H. Hartwell; Madeline F. Schiesser; Keohane & D'Alessandro PLLC

(57) ABSTRACT

Approaches presented herein enable optimizing a display of tabular data from a 2-D table as a folding 3-D table having a plurality of vectors in a GUI. More specifically, a scaling ratio is calculated to fit the plurality of vectors within a display area of the GUI based on a cumulative width of the plurality of vectors and a width of the display area of the GUI. A maximum angle of rotation for at least one vector is calculated based on a legibility of the vector. The scaling ratio can be applied to a width of at least one vector to yield a modified width of the vector. The 2-D table is then rendered as a 3-D table in which the at least one vector is depicted as a modified vector angled within a maximum angle of rotation between a horizontal and a vertical axis.

20 Claims, 9 Drawing Sheets

Related U.S. Application Data

No. 15/849,757, filed on Dec. 21, 2017, now Pat. No. 10,409,905.

(51) Int. Cl.
*G06F 3/0484* (2013.01)
*G06T 11/60* (2006.01)
*G06F 17/21* (2006.01)
*G06F 3/0482* (2013.01)
*G06T 11/20* (2006.01)
G06F 3/0485 (2013.01)
G06F 3/0481 (2013.01)

(52) U.S. Cl.
CPC .......... *G06F 17/211* (2013.01); *G06F 17/246* (2013.01); *G06T 11/206* (2013.01); *G06T 11/60* (2013.01); *G06T 15/10* (2013.01); *G06F 3/0485* (2013.01); *G06F 3/04815* (2013.01); *G06F 2203/04806* (2013.01); *G06T 2200/04* (2013.01); *G06T 2200/24* (2013.01)

(56) References Cited

U.S. PATENT DOCUMENTS

| | | | |
|---|---|---|---|
| 7,774,695 | B2 | 8/2010 | Kobylinski |
| 8,312,366 | B2 | 11/2012 | Folting |
| 9,858,718 | B2 | 1/2018 | Petill et al. |
| 2007/0079230 | A1 | 4/2007 | Vignet |
| 2007/0266308 | A1 | 11/2007 | Kobylinski |
| 2008/0104498 | A1 | 5/2008 | Molander et al. |
| 2011/0050728 | A1 | 3/2011 | Williamson |
| 2011/0055680 | A1 | 3/2011 | Williamson |
| 2011/0176720 | A1 | 7/2011 | Van Osten et al. |
| 2014/0157101 | A1 | 6/2014 | Hogan et al. |
| 2015/0135113 | A1 | 5/2015 | Sekharan |
| 2019/0311027 | A1 | 10/2019 | Han et al. |

OTHER PUBLICATIONS

Awwwards-team, "Creative UI Design Examples for Great UX", retrieved from https://www.awwwards.com/creative-ui-design-examples-for-great-ux.html, archived on Mar. 2, 2015 at https://web.archive.org/web/20150302150108/https://www.awwwards.com/creative-ui-design-examples-for-great-ux.html.

Awwwards-team, "Stunning Resources for Paper Folding Animation Effect", retrievedhttp://awwwards.com/stunning-resources-for-paper-folding-animation-effect.html, archived on Feb. 20, 2016 at https://web.archive.org/web/20160220100517/http://www.awwwards.com/stunning-resources-for-paper-folding-animation-effect.html.

Liu, Zhengxi, U.S. Appl. No. 15/849,757, Notice of Allowance dated May 1, 2019, 8 pgs.

Liu, Zhengxi, U.S. Appl. No. 16/451,111, Notice of Allowance dated Sep. 30, 2019, 18 pgs.

* cited by examiner

THREE-DIMENSIONAL MULTI-VECTOR TABLES

This patent document is a continuation of, and claims the benefit of, co-pending and co-owned U.S. patent application Ser. No. 16/451,111, filed Jun. 25, 2019, which is a continuation of commonly owned U.S. patent application Ser. No. 15/849,757, filed Dec. 21, 2017 and issued Sep. 10, 2019 as U.S. Pat. No. 10,409,905.

TECHNICAL FIELD

The present invention relates generally to a solution for optimizing a display of tabular data and, more specifically, to optimizing a display of tabular data by rendering a three-dimensional multi-vector table in a graphic user interface (GUI).

BACKGROUND

In daily work, many people often use office software tools to manage and view various data, from student test scores to corporate financial reports. Popular data analysis office software tools include Microsoft Excel, Apache OpenOffice Calc, LibreOffice, Google Sheets, and Zoho Sheet. (Excel is a registered trademark of Microsoft Corporation, OpenOffice is a trademark of The Apache Software Foundation, LibreOffice is a registered trademark of The Document Foundation, Google Sheets is a trademark of Google Inc., and Zoho is a registered trademark of Zoho Corporation.) These software tools are generally characterized by the presentation of a tabular spreadsheet in a user interface showing multiple columns and rows in which a user may enter data. It is generally the practice among spreadsheet users to treat each column as an attribute class (e.g., names, ID numbers) and each row as an object having several specific attributes associated with it (e.g., John Smith, 12345).

SUMMARY

Approaches presented herein enable optimizing a display of tabular data from a 2-D table as a folding 3-D table having a plurality of vectors in a GUI. More specifically, a scaling ratio is calculated to fit the plurality of vectors within a display area of the GUI based on a cumulative width of the plurality of vectors and a width of the display area of the GUI. A maximum angle of rotation for at least one vector is calculated based on a legibility of the vector. The scaling ratio can be applied to a width of at least one vector to yield a modified width of the vector. The 2-D table is then rendered as a 3-D table in which the at least one vector is depicted as a modified vector angled within a maximum angle of rotation between a horizontal and a vertical axis.

One aspect of the present invention includes a method for optimizing a display of tabular data from a two-dimensional (2-D) table as a folding three-dimensional (3-D) table having a plurality of vectors in a graphic user interface (GUI), the method comprising: calculating a scaling ratio based on a cumulative width of the plurality of vectors and a width of a display area in the GUI; determining a maximum angle of rotation for at least one vector of the plurality of vectors based on a legibility of the at least one vector; determining a modified width of the at least one vector by applying the scaling ratio to a width of the at least one vector; calculating a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and adjusting a rotation of at least one vector of the plurality of vectors in the case that the proposed angle of rotation for the at least one vector exceeds the maximum angle of rotation for the at least one vector.

Another aspect of the present invention includes a computer system for optimizing a display of tabular data from a two-dimensional (2-D) table as a folding three-dimensional (3-D) table having a plurality of vectors in a graphic user interface (GUI), the computer system comprising: a memory medium comprising program instructions; a bus coupled to the memory medium; and a processor, for executing the program instructions, coupled to a tabular data display optimization engine via the bus that when executing the program instructions causes the system to: calculate a scaling ratio based on a cumulative width of the plurality of vectors and a width of a display area in the GUI; determine a maximum angle of rotation for at least one vector of the plurality of vectors based on a legibility of the at least one vector; determine a modified width of the at least one vector by applying the scaling ratio to a width of the at least one vector; calculate a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and adjust a rotation of at least one vector of the plurality of vectors in the case that the proposed angle of rotation for the at least one vector exceeds the maximum angle of rotation for the at least one vector.

Yet another aspect of the present invention includes a computer program product for optimizing a display of tabular data from a two-dimensional (2-D) table as a folding three-dimensional (3-D) table having a plurality of vectors in a graphic user interface (GUI), the computer program product comprising a computer readable hardware storage device, and program instructions stored on the computer readable hardware storage device, to: calculate a scaling ratio based on a cumulative width of the plurality of vectors and a width of a display area in the GUI; determine a maximum angle of rotation for at least one vector of the plurality of vectors based on a legibility of the at least one vector; determine modified width of the at least one vector by applying the scaling ratio to a width of the at least one vector; calculate a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and adjust a rotation of at least one vector of the plurality of vectors in the case that the proposed angle of rotation for the at least one vector exceeds the maximum angle of rotation for the at least one vector.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
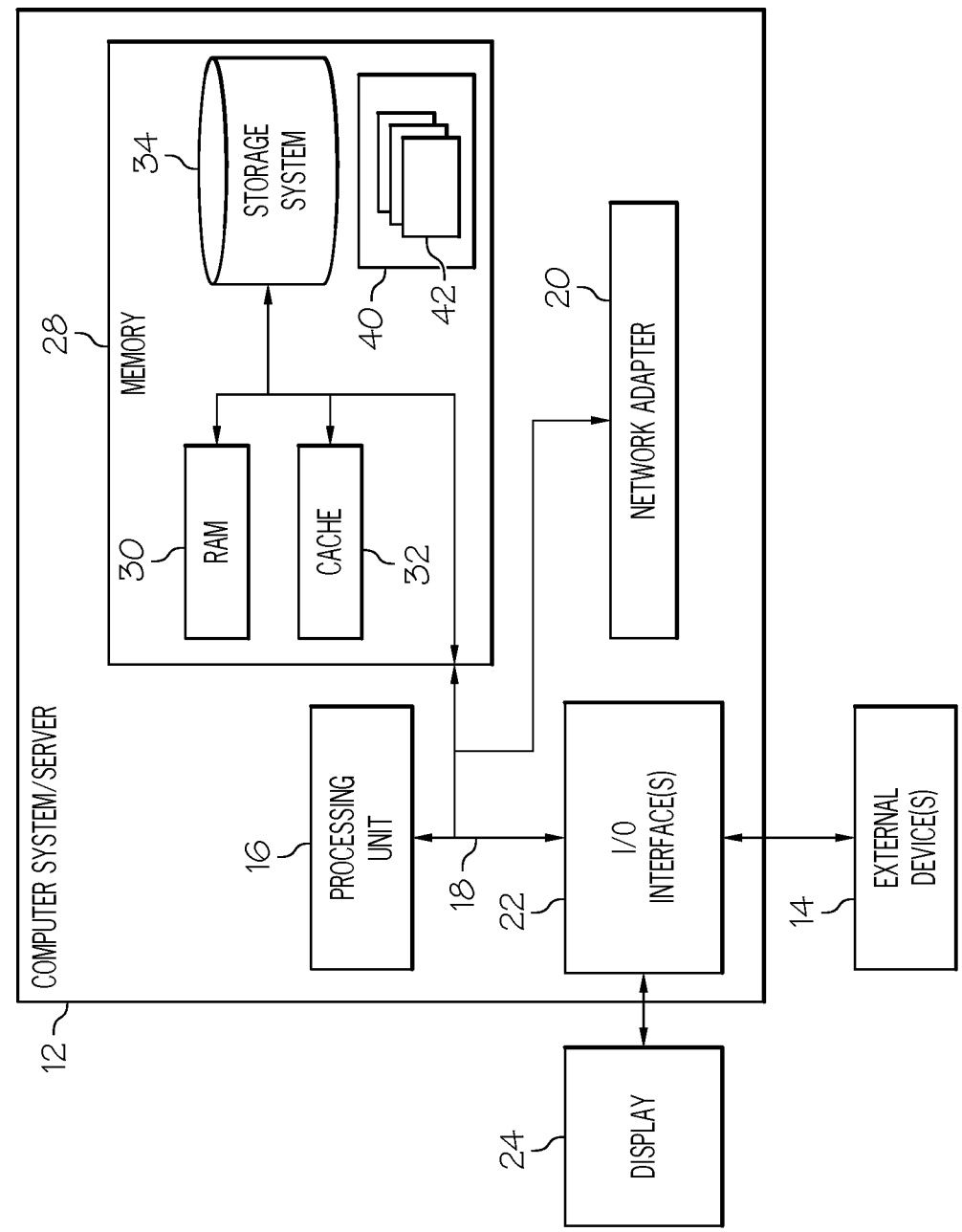
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for optimizing a display of tabular data from a 2-D table as a folding 3-D table having a plurality of vectors in a GUI. More specifically, a scaling ratio is calculated to fit the plurality of vectors within a display area of the GUI based on a cumulative width of the plurality of vectors and a width of the display area of the GUI. This scaling ratio is applied to a width of at least one vector to yield a modified width of the vector. The 2-D table is then rendered as a 3-D table in which the at least one vector is depicted as a modified vector angled between a horizontal and a vertical axis. This modified vector has an actual width equal to the modified width and a diagonal length equal to the width of the at least one vector.

Referring now to FIG. 1, a computerized implementation 10 of an embodiment for optimizing a display of tabular data will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for optimizing a display of tabular data. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a display of tabular data, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
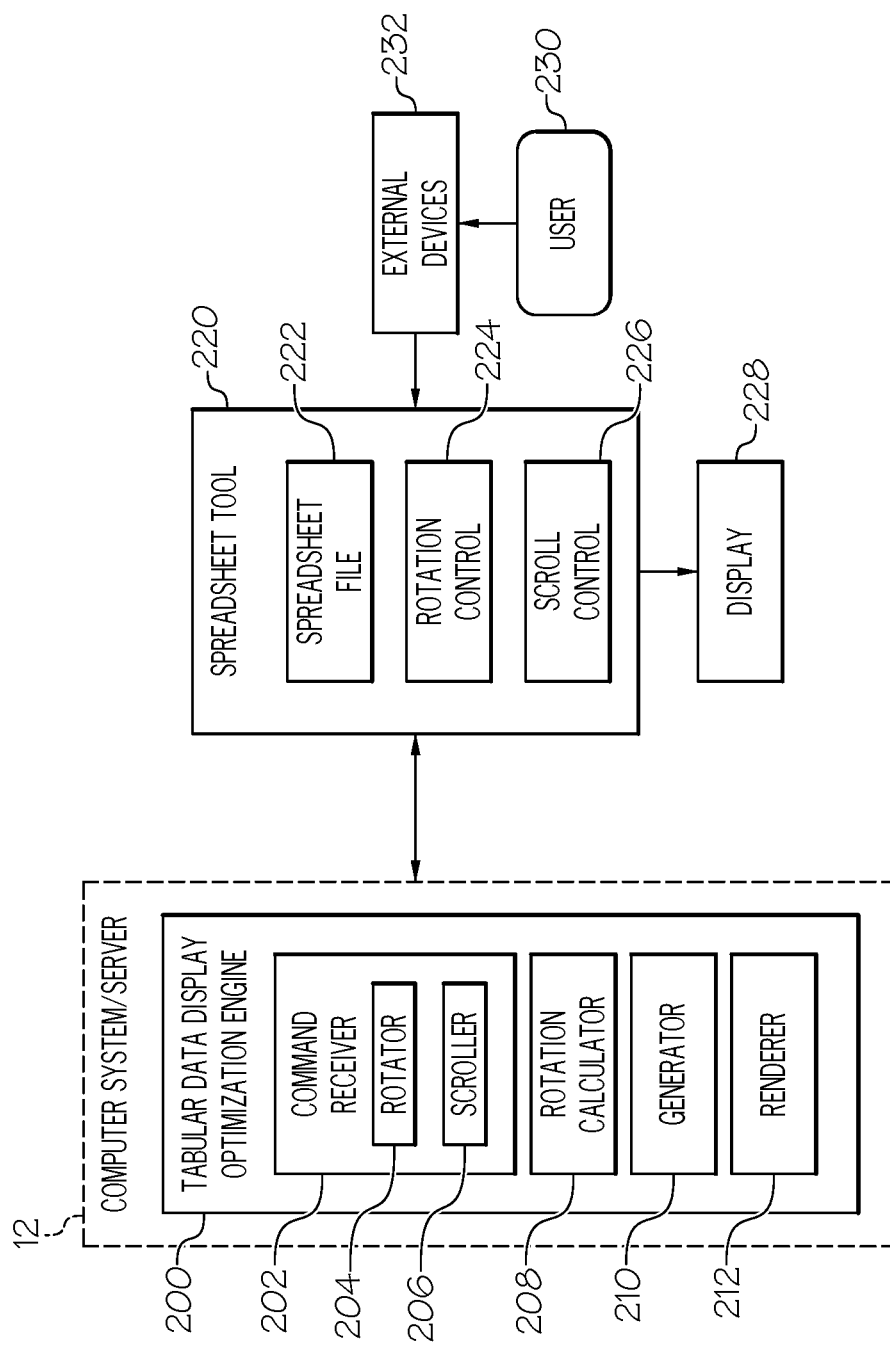
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to a networked computing environment (e.g., a cloud computing environment). A stand-alone computer system/server 12 is shown in FIG. 2 for illustrative purposes only. In the event the teachings recited herein are practiced in a networked computing environment, each client need not have a tabular data display optimization engine 200 (hereinafter "system 200"). Rather, all or part of system 200 could be loaded on a server or server-capable device that communicates (e.g., wirelessly) with the clients to provide for optimizing a display of tabular data in a graphic user interface (GUI). Regardless, as depicted, system 200 is shown within computer system/server 12. In general, system 200 can be implemented as program/utility 40 on computer system 12 of FIG. 1 and can enable the functions recited herein.

Along these lines, system 200 may perform multiple functions similar to a general-purpose computer. Specifically, among other functions, system 200 can optimize a display of tabular data in a GUI. To accomplish this, system 200 can include a set of components (e.g., program modules 42 of FIG. 1) for carrying out embodiments of the present invention. These components can include, but are not limited to, command receiver 202, which can contain rotator 204 and scroller 206 for interpreting specific commands; rotation calculator 208; generator 210; and renderer 212.

Through computer system/server 12, system 200 can be in communication with spreadsheet tool 220. Although shown as distinct from computer system/server 12 in FIG. 2, in some embodiments spreadsheet tool 220 can reside on computer system/server 12 or on a computer system/server having similar attributes as computer system/server 12 as described above with respect to FIG. 1. Furthermore, although also shown as distinct from system 200 in FIG. 2, in some embodiments spreadsheet tool 220 can be program/utility 40 on computer system 12 with system 200 being a component (e.g., program module 42 of FIG. 1) of spreadsheet tool 220. In some embodiments, spreadsheet tool 220 has access to one or more computer files 222 configured to store tabular data, such as an ".xls", ".xlt", or ".xml" file. Spreadsheet tool 220 can further have one or more controls operated in a GUI for manipulating the appearance of tabular data displayed in the GUI, including rotation control 224 and scroll control 226. Spreadsheet tool 220 can display a spreadsheet table or other tabular data for viewing by user 230 on external display 228, which can be connected to a computer system on which spreadsheet tool 220 runs or in which spreadsheet tool 220 is in communication. One or more external devices 232, such as a mouse or keyboard, can also be connected to a computer system on which spreadsheet tool 220 runs and can receive input from user 230.

Before proceeding, it should also be understood that, although illustrative examples discussed herein will depict the vectors being rotated according to embodiments of the present invention as columns of a spreadsheet table, the methodologies discussed herein can also be applied to rows and other tabular displays.

Figure 3:
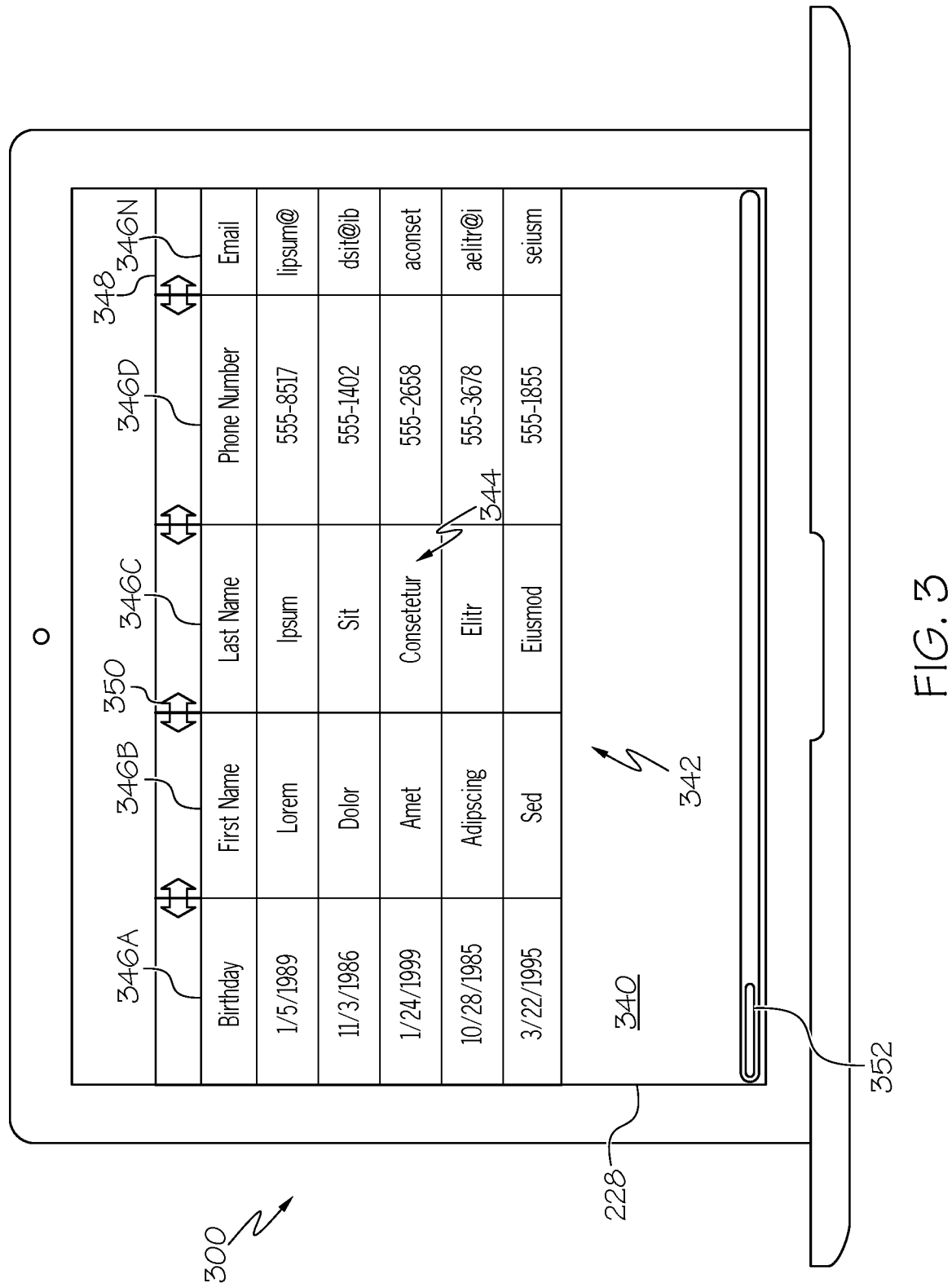
FIG. 3 shows a traditional display of a spreadsheet table in a GUI according to illustrative embodiments.

Referring now to FIG. 3, traditional display 300 of spreadsheet table 342 in GUI 340 is shown. The inventors of the present invention have found that traditional spreadsheet and other tabular software tools, used frequently to analyze and manipulate data 344 in many fields of work, can be cumbersome, with displayed tabular data 344 often difficult to view. For instance, spreadsheet 342 may have too many vectors 346A-N (singular 346N) or improperly sized vectors, preventing easy viewing of datasets when displayed in GUI 342 on external display 228. Some vectors 346A-N, such as obscured vector 348, may be partially or completely hidden from view. Some vectors 346A-N may be too wide to display at the same time and/or separated by too many other vectors 346A-N and therefore too far apart for simultaneous viewing. Therefore, it is often necessary for the traditional spreadsheet software tool to provide controls within the GUI by which user 230 may move and manipulate spreadsheet table 342, such as scroller 352 to scroll back and forth between different vectors 346A-N and/or width adjuster 350 to adjust and re-adjust the width of vectors 346A-N when user 230 wants to look at different vectors of data. As a result, when a user attempts to adjust GUI 340 to show a particular vector 346N, the traditional spreadsheet software tool typically must compensate for the display space consumed by this particular vector, and therefore forces other vectors 348 out of the display area of GUI 340 and/or narrows other vectors shown in GUI 340, sometimes to the point where data 344 contained therein can no longer be read. Then, when user 230 attempts to manipulate GUI 342 to find currently hidden or obscured vector 348, the traditional spreadsheet software tool must again adjust the GUI 340, potentially obscuring yet another vector of data.

Accordingly, the inventors of the present invention have developed a system that permits spreadsheet software to provide a user with a fully viewable spreadsheet table. Furthermore, embodiments of the present invention permit spreadsheet software to present a user with a GUI having minimal controls for manipulating all vectors in an easy and efficient manner. These and other features of the present invention are realized by enabling a GUI to display an optimized spreadsheet table that, from a user's perspective, is rendered to appear as a multi-folded three-dimensional (3-D) corrugation, thereby decreasing display space consumed by each vector of the spreadsheet table.

Furthermore, embodiments of the present invention offer several advantages. By optimizing a spreadsheet table as a multi-folded 3-D corrugation, spreadsheet tools can display vectors that otherwise, for lack of adequate space in a two-dimensional rendering of the spreadsheet table, may have to be hidden or obscured outside the field of view of the display. This allows a spreadsheet tool to show a user more data in a single display, offering the user the opportunity to see a whole picture of the data at once. Moreover, initially presenting the spreadsheet table as a 3-D corrugation decreases the number of adjustments that a user will attempt to make in a GUI of the spreadsheet software tool, thereby decreasing the number of display changes the spreadsheet software tool will need to calculate. To the extent that a user might desire to adjust the display, the spreadsheet software tool can receive these adjustments as a request to increase/decrease a fold of the spreadsheet table or a request to scroll through vectors on the table, thereby making user interactions with a GUI of the spreadsheet software tool simple and more efficient.

Accordingly, referring now to FIG. 4 in connection with FIG. 2, a rendering of spreadsheet file 222 as 3-D corrugated spreadsheet table 400 (hereinafter 3-D table 400) in GUI 440 on external display 228 according to illustrative embodiments of the present invention is shown. Referring also to FIG. 5, rotations of vectors 346A-N of two-dimensional (2-D) spreadsheet table 342 about axis ($a_{i,i+1}$, i=0, 2, 4, . . . , N) to form vectors 446A-N (singular 446N) of 3-D table 400 according to illustrative embodiments of the present invention are shown. In some embodiments of the present invention, spreadsheet tool 220 may initially display spreadsheet file 222 as a traditional 2-D rendering, as spreadsheet table 342 is depicted in FIG. 3. In this case, system 200 can receive a request from spreadsheet tool 220 (e.g., initiated by user 230 through external device 232 or initiated by spreadsheet tool 220 when the width of spreadsheet table 342 exceeds a width of GUI 440) to re-render spreadsheet file 222 as 3-D table 400. In other embodiments, system 200 can receive a request from spreadsheet tool 220

(e.g., when spreadsheet tool 220 initially opens spreadsheet file 222) to initially render spreadsheet file 222 as 3-D table 400.

In any case, command receiver 202 can receive the request to render spreadsheet file 222 as 3-D table 400 along with scaling information, including width (W) of the display area (line A of FIG. 5) and 2-D width ($w_i$) of each vector 346N (line B of FIG. 5), as well as, optionally, cell content 344. Rotation calculator 208 receives this scaling information and calculates a scaling ratio (r) by which to scale the widths of vectors 346A-N. Scaling ratio (r) is calculated in the following manner:

$$r = \frac{W}{\sum_{i=1}^{N} w_i}$$

where there are N vectors 346A-N in spreadsheet table 342, the width of each vector 346N is $w_i$ (i=1, 2, ..., N), and the width of the display area is W. Rotation calculator 208 applies scaling ratio (r) to width ($w_i$) of each vector 346N to find width ($m_i$) of each vector 446N of 3-D table 400, such that:

$$m_i = w_i \cdot r (i=1,2, \ldots, N)$$

where $m_i$ is the width of each vector 446N of 3-D table 400. For vectors of equal width, the angle of rotation (θ) about axis ($a_{i,i+1}$) of vectors 446A-N can be calculated, for any vector (i) as:

$$\theta_i = \cos^{-1} \frac{m_i}{w_i}$$

Generator 210 uses the actual width ($m_i$) and the apparent width ($w_i$) of each vector 446N of 3-D table 400 to recast spreadsheet table 342 as 3-D table 400. As shown in line C of FIG. 5, each vector 446N can be modeled as a right triangle, with apparent width ($w_i$) as the hypotenuse and actual width ($m_i$) as the horizontal leg of the triangle. Each cell 456 therefore appears as a parallelogram, having one pair of sides parallel with this hypotenuse of the right triangle and the other pair of sides parallel with the vertical leg of the triangle. Content 444 of cell 456 is likewise written slanted, parallel to the hypotenuse of the right triangle. Generator 210 can pair adjacent vectors 446A-N, such as (1,2), (3,4), etc., to form each wave of 3-D table 400.

The above discussion assumes that all vectors 346A-N are of the same width, but that need not be the case. As shown in line D of FIG. 5, vectors 346A-N may differ in width, such as vector 1, having width $w_{1'}$, and vector 2, having width $w_{2'}$. In this case, rotation calculator 208 continues to calculate scaling ratio (r) as above:

$$r = \frac{W}{\sum_{i=1}^{N} w_i}$$

Further, as above, rotation calculator 208 applies scaling ratio (r) to width ($w_i$) of each vector 346N to find width ($m_i$) of each vector 446N of 3-D table 400, such that:

$$m_i = w_i \cdot r (i=1,2, \ldots, N)$$

Accordingly, for $w_1 > w_2$:

$$m_{1'} = w_{1'} \cdot r = w_{1'} \cdot \frac{W}{\sum_{i=1}^{N} w_i}, m_{2'} = w_{2'} \cdot r = w_{2'} \cdot \frac{W}{\sum_{i=1}^{N} w_i}, m_{1'} > m_{2'}$$

The angle of rotation of vectors 446A-N of differing widths differs between these vectors, but can still be calculated for any vector i as:

$$\theta_i = \cos^{-1} \frac{m_i}{w_i}$$

Accordingly, for $w_1 > w_2$:

$$\alpha = \cos^{-1} \frac{m_1}{w_1}, \beta = \cos^{-1} \frac{m_i}{w_i}, \alpha > \beta$$

As described above with respect to line C of FIG. 5, each of vectors 1 and 2 can be modeled as abutting right triangle, as shown in line E of FIG. 5, with apparent width ($w_i$) as the hypotenuse and actual width ($m_i$) as the horizontal leg of the triangle.

In some embodiments, generator 210 can generate 3-D table 400 by generating instructions for spreadsheet tool 220 to render 3-D table 400 or to modify spreadsheet table 342 into 3-D table 400. Renderer 212 can transmit these instructions to spreadsheet tool 220 for rendering. In some other embodiments, renderer 212 can directly render 3-D table 400 from the rendering instructions generated by generator 210. In any case, system 200 provides GUI 440 with a depiction of spreadsheet file 222 as 3-D table 400 for display in external display 228.

In some embodiments, generator 210 can determine whether cell content 344 (444 in FIG. 4) will be legible to user 230 at the angle of rotation ($\theta_i$) of each vector 446N calculated by rotation calculator 208. In some embodiments, the maximum angle of rotation ($\theta_{max}$) can be set by system 200 or spreadsheet tool 220. In the case of the latter, command receiver 202 can receive the maximum angle of rotation ($\theta_{max}$) as a hard limitation on how far vectors 446A-N can be rotated around axis ($a_{i,j+1}$). In the case of the former, the maximum angle of rotation ($\theta_{max}$) could be determined a number of ways, including, but not limited to, being preset by a developer, learned by generator 210 based on user feedback, or determined by generator 210 in real time. In the case of the last, generator 210 can test render one or more cells 456 of 3-D table 400 and use image recognition technology to assess whether the data in the tested cell 456 would be legible to human user 230. It should be understood that the maximum angle of rotation ($\theta_{max}$) may not be the same for all angles of rotation ($\theta_i$) of all vectors 446A-N. For instance, a vector that contains strings may have a lower maximum angle of rotation ($\theta_{max}$) than a vector that contains integers, because strings are generally harder to read at an angle than integers.

In the case where the angle of rotation calculated by rotation calculator 208 is greater than the maximum angle of rotation ($\theta_i > \theta_{max}$) for a particular vector 446N, generator 210 can adjust that angle to the maximum angle of rotation $\theta_i = \theta_{max}$. This also has the effect of lengthening the actual width ($m_i$) of that particular vector. In order to compensate for this increase in the width of one vector, generator 210 can further determine whether any other angle of rotation for any other vector in 3-D table 400 is under the maximum angle of rotation for that particular vector. In the case that generator 210 find that an angle of rotation of another vector is under the maximum angle for that particular vector, generator 210 can increase that angle up to the maximum angle of rotation for that particular vector ($\theta_i \leq \theta_{max}$), thereby decreasing the actual width ($m_i$) of that particular vector, to keep the overall width of 3-D table 400 under or at the width (W) of the display area of GUI 440. In the case that this ($\theta_{all} = \theta_{max}$) is insufficient to keep the overall width of 3-D table 400 under or at the width (W) of the display area of GUI 440, generator 210 can generate 3-D table 400 as wider than the display area of GUI 440 and provider slider 452. Generator 210 can configure slider 452 to be tied to scroll control 226 of spreadsheet tool 220 as an interactive user control in GUI 440 that, when interacted with by user 230, causes spreadsheet tool 220 to slide 3-D table 400 back and forth in the display area of GUI 440. In some embodiments, generator 210 can, but need not in all embodiments, maintain all angles of rotation of vectors 446A-N at the maximum angle of rotation ($\theta_{all} = \theta_{max}$) to reduce the amount 3-D table 400 might be slid back and forth when viewed by user 230.

Figure 4:
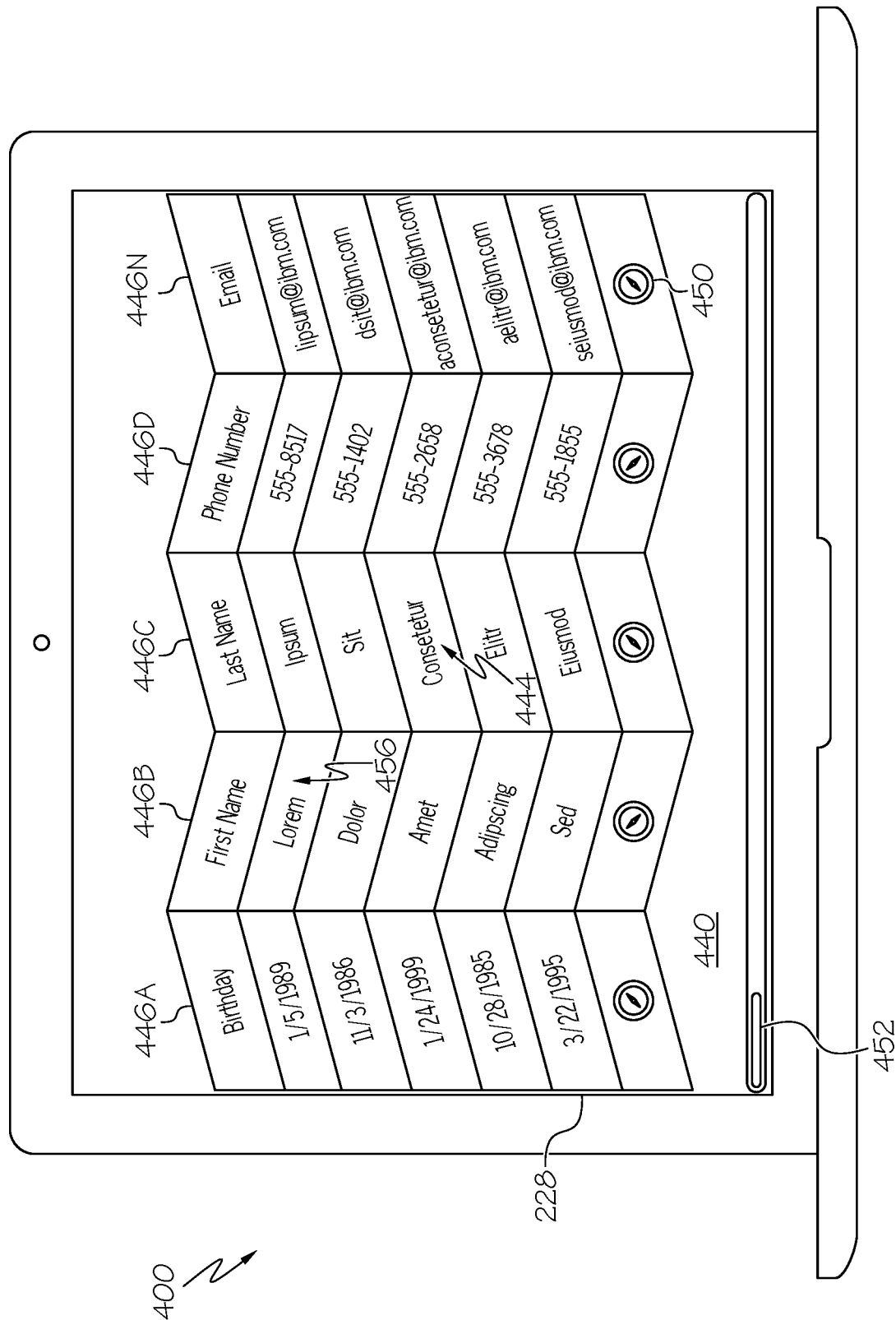
FIG. 4 shows a rendering of a spreadsheet file 222 as a 3-D corrugated spreadsheet table in a GUI 440 on an external display according to illustrative embodiments.
Figure 5:
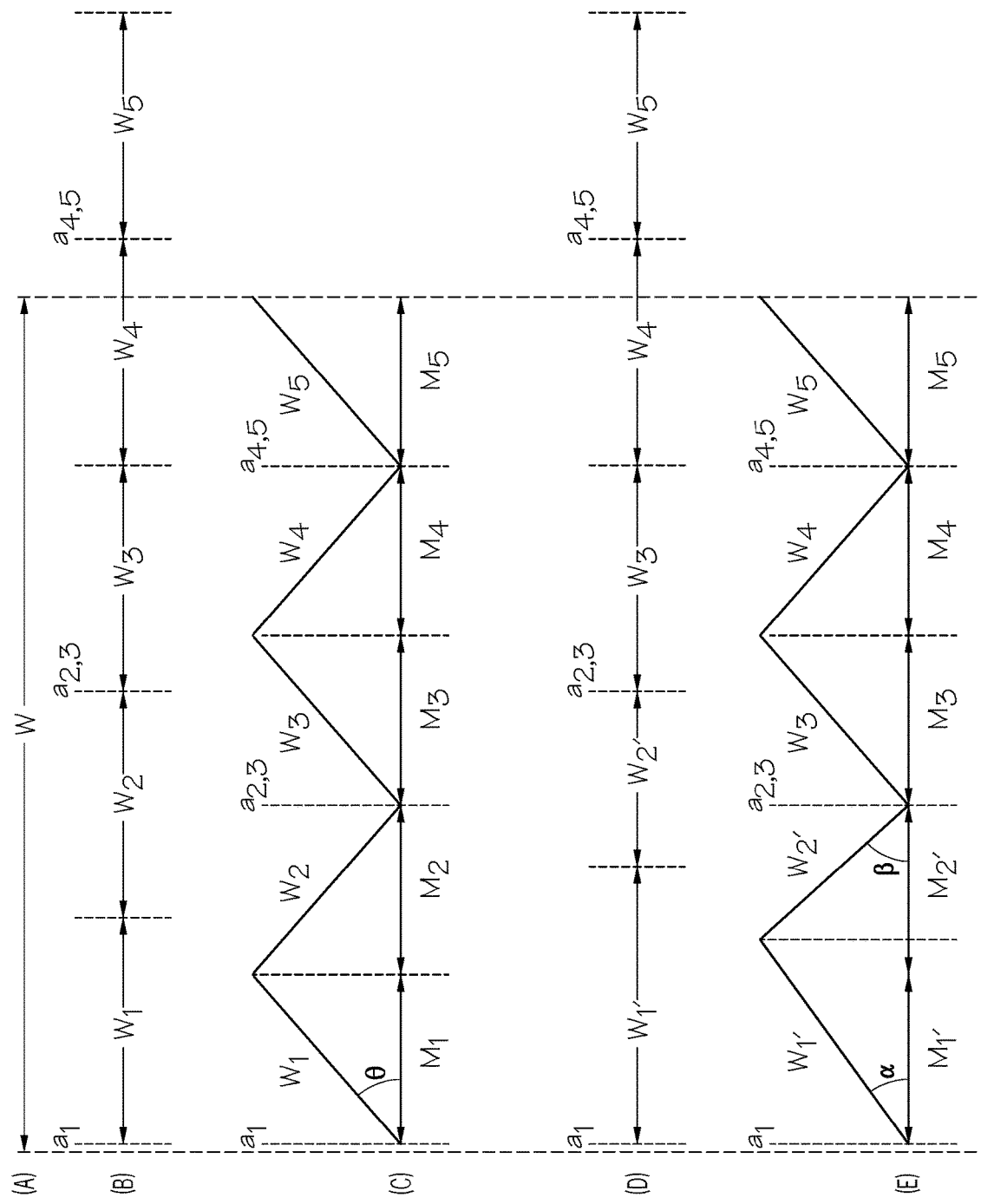
FIG. 5 shows rotations of vectors of a 2-D spreadsheet table about axis to form angled vectors according to illustrative embodiments.
Figure 6:
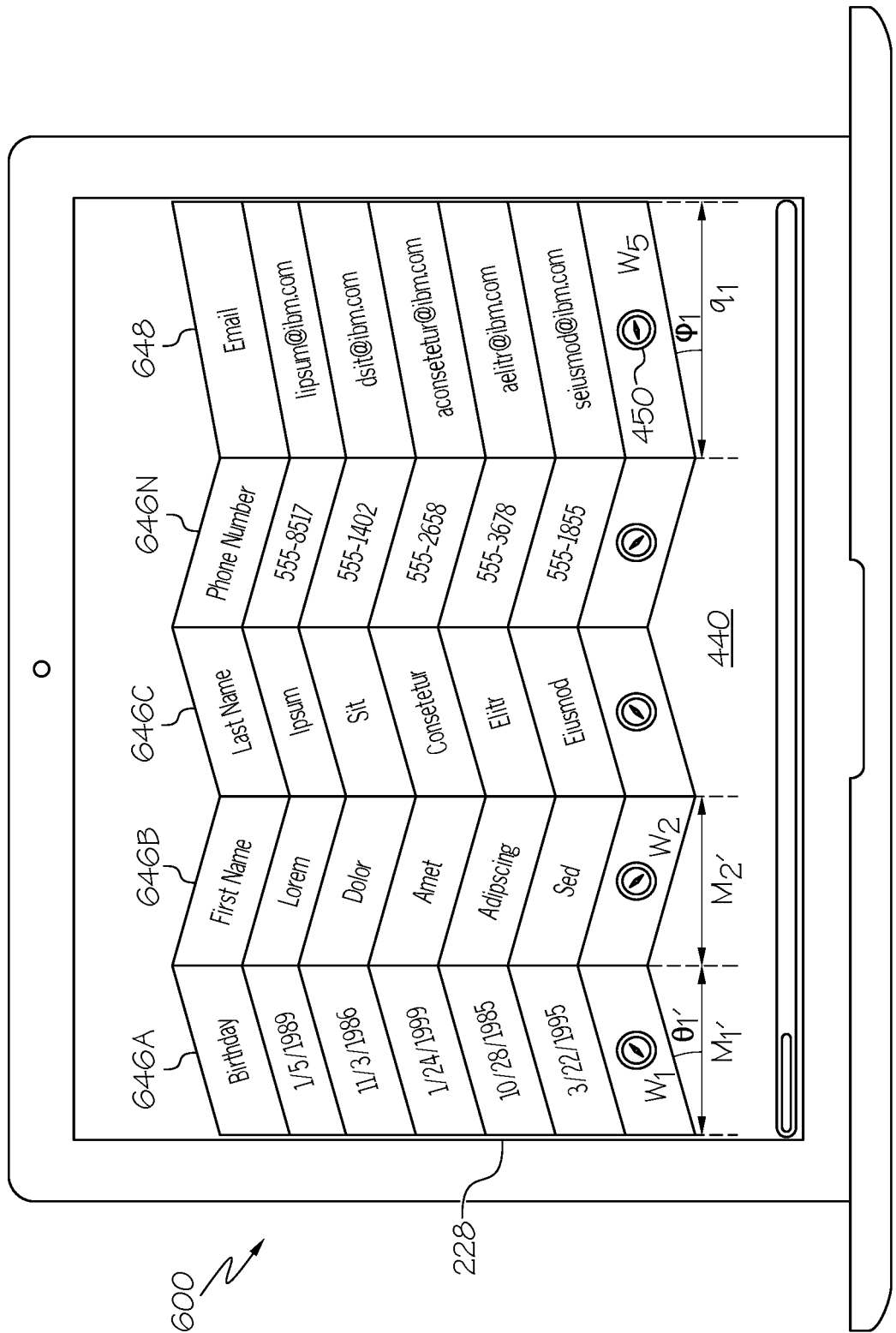
FIG. 6 shows an example of a user-manipulated 3-D table according to illustrative embodiments.

Referring now to FIG. 6 in connection with FIG. 4, an illustrative example of a user-manipulated 3-D table 600 is shown according to embodiments of the present invention. In some embodiments, generator 210 can provide GUI 440 with one or more rotation manipulators 450 associated with vectors 446A-N of 3-D table 400. Generator 210 can configure rotation manipulators 450 to be tied to rotation control 224 of spreadsheet tool 220 as an interactive user control in GUI 440 that, when interacted with by user 230, causes the angle of rotation ($\theta_i$) of a particular vector 446N (manipulated vector 648) with which rotation manipulator 450 is associated to change to manipulated angle of rotation ($\varphi_i$) with actual width ($m_i$) changing to manipulated actual width ($q_i$). The angle of rotation can be increased ($\theta_i < \varphi_i$ and $m_i > q_i$) or decreased ($\theta_i > \varphi_i$ and $m_i < q_i$) depending on how user 230 interacts with rotation manipulator 450. For example, generator 210 can configure rotation manipulator 450 such that a user interaction in one direction increases the angle of rotation, while a user interaction in the opposing direction decreases the angle of rotation.

In some embodiments, generator 210 can further instruct or configure rotation control 224 to respond to changes in angle of rotation ($\varphi_i$) or actual width ($q_i$) of manipulated vector 648 in 3-D manipulated 3-D table 600 by adjusting other vectors 446A-N (adjusted vectors 648A-N) in 3-D table 400. For example, generator 210 can instruct or configure rotation control 224 to proportionally change the angle of rotation ($0\theta_i'$) and actual width ($m_i'$) of adjusted vectors 646A-N (singular 646N) in manipulated 3-D table 600 from those of 3-D table 400 to keep the 3-D table the same width as the display area of GUI 440.

In some other embodiments, user interactions with rotation manipulators 450 are relayed by rotation control 224 to system 200, where these interactions are interpreted by rotator 204 of command receiver 202 as commands to adjust 3-D table 400. Accordingly, rotation calculator 208 can receive new angle of rotation ($\varphi_i$) or new actual width ($q_i$) set by user 230 and, from these, calculate a new scaling ratio (r') by which to scale the widths of vectors 646A-N. New scaling ratio ($r_m'$) by which to scale the existing actual vector widths ($m_i$) is calculated in the following manner:

$$r'_m = \frac{W - \sum_{i=1}^{k} q_i}{\sum_{i=1}^{N} m_i}$$

where there are k user-manipulated vectors 648 and a total of N other vectors 646A-N in user-manipulated 3-D table 600, the actual width of each vector 648 is $q_i$ (i=1, 2, ..., k) and actual width of each other vector 646N is $m_i$ (i=1, 2, ..., N), and the width of the display area of GUI 440 is W. Rotation calculator 208 applies new scaling ratio ($r_m'$) to actual width ($m_i$) of each vector 446A-N to find adjusted actual width ($m_i'$) of each vector 646A-N of user-manipulated 3-D table 600, such that:

$$m_i' = m_i \cdot r_m' (i=1,2, \ldots, N)$$

where $m_i'$ is the adjusted width of each vector 646A-N of user-manipulated 3-D table 600. For each vector 646A-N, the angle of rotation ($\theta_i'$) about axis $a_{i,i+1}$, i=0, 2, 4, ..., N of vectors 646A-N can be calculated as:

$$\theta_i' = \cos^{-1} \frac{m_i'}{w_i}$$

From the results of these calculations, generator 210 can generate 3-D table 400 (using the same methodologies as described above with respect to the initial recast of spreadsheet table 342 as 3-D table 400) as user-manipulated 3-D table 600 having one or more vectors 648 having a user-selected angle of rotation $\varphi_i$ and the remaining vectors 646A-N in user-manipulated 3-D table 600 adjusted to keep the 3-D table the same width (W) as the display area of GUI 440.

Figure 7:
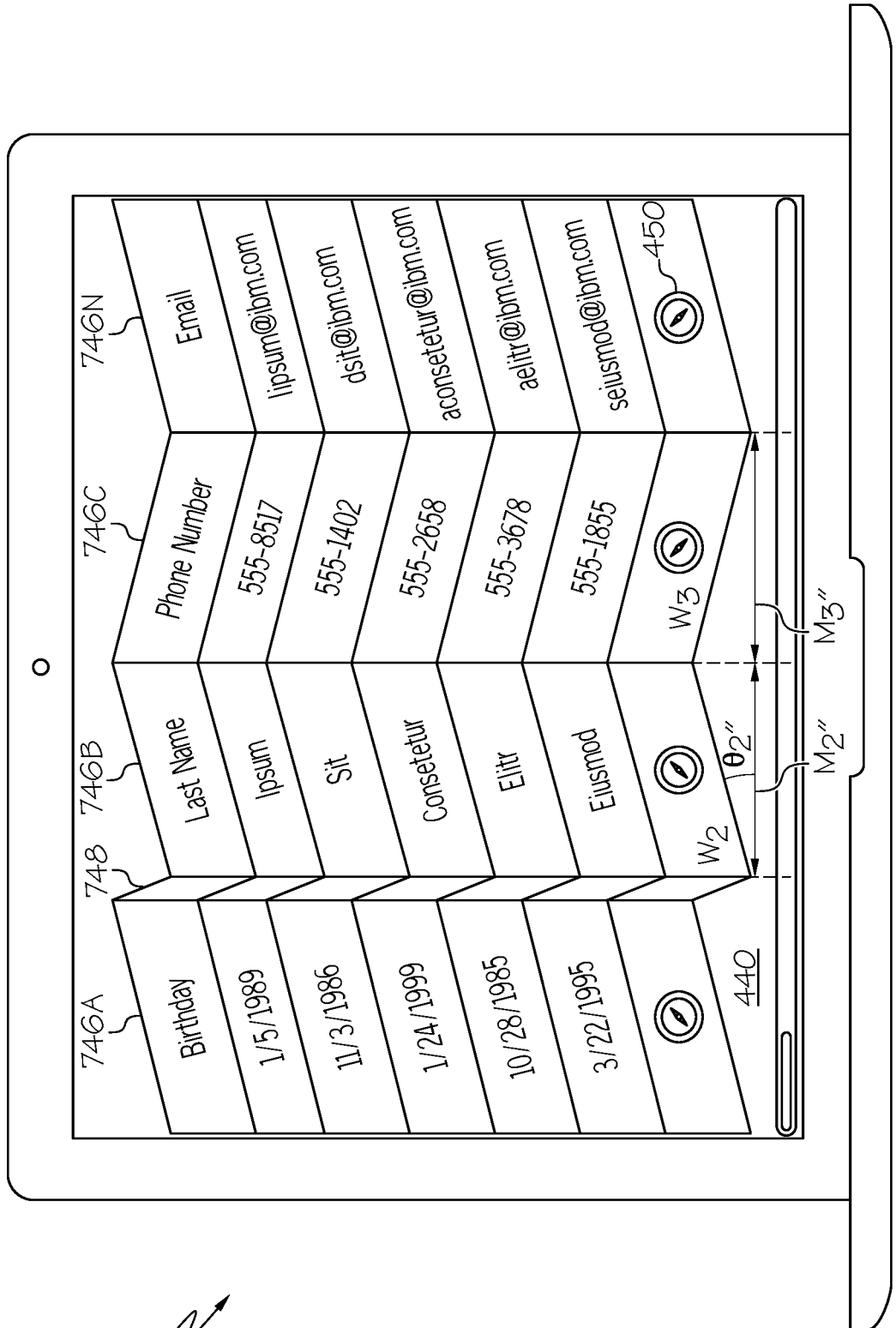
FIG. 7 shows an example of a 3-D table with a hidden vector according to illustrative embodiments.

Referring now to FIG. 7 in connection with FIG. 4, an illustrative example of 3-D table 700 with hidden vector 748 is shown according to embodiments of the present invention. In some embodiments, generator 210 can configure rotation manipulators 450 associated with vectors 446A-N of 3-D table 400 to hide a particular vector 446N (hidden vector 748). Generator 210 can configure rotation manipulators 450 and rotation controller 224 to hide hidden vector 748 in response to one or more occurrences. For example, in the case that rotation control 224 receives an indication that user 230 is interacting with rotation manipulators 450 in GUI 440 in such a way as to indicate that user 230 wants to hide hidden vector 748 (e.g., a double click), then generator 210 can configure rotation control 224 to hide hidden vector 748. In another example, in the case that rotation control 224 determines that user 230 is attempting to rotate vector 748 in GUI 440 past the maximum angle of rotation ($\theta_{max}$), such that content in vector 748 would no longer be legible, then generator 210 can configure rotation control 224 to hide hidden vector 748. Generator 210 can also configure rotation control 224 to un-hide hidden vector 748 in response to an indication that user 230 wants to reveal vector 748 (e.g., a double click in GUI 440 on the line between vectors 746A and 746B directly adjacent to hidden vector 748). This process of hiding vectors can be used to bring together two vectors 746A-N that normally would not be adjacent.

Similar to the illustrative example discussed above with reference to FIG. 6, in some embodiments, generator 210 can instruct or configure rotation control 224 to respond to changes to 3-D table 400, such as the hiding of vector 748 by adjusting remaining vectors 746A-N (singular 746N). In some other embodiments, user interactions with rotation manipulators 450 are relayed by rotation control 224 to system 200, where these interactions are interpreted by rotator 204 of command receiver 202 as commands to adjust 3-D table 400. Similar to the process discussed above with reference to FIG. 6, rotation calculator 208 can, based on the information received by command receiver 202, calculate a new scaling ratio ($r_m''$) by which to scale the existing actual vector widths ($m_i$) of vectors 746A-N with the following calculations:

$$r_m'' = \frac{W}{\sum_{i=1}^{N} m_i},$$

$$m_i'' = m_i \cdot r_m'', (i = 1, 2, \ldots, N),$$

$$\theta_i'' = \cos^{-1} \frac{m_i''}{w_i}$$

where there are N visible vectors 746A-N in 3-D table 700, the actual width of each other vector 746N is $m_i$ (i=1, 2, ..., N), the width of the display area of GUI 440 is W, $m_i''$ is the adjusted width of each vector 746A-N of 3-D table 700, and $\theta''$ is the angle of rotation about axis $a_{i,i+1}$, i=0, 2, 4, ..., N of vectors 746A-N. Accordingly, from the results of these calculations, generator 210 can generate 3-D table 400 (using the same methodologies as described above with respect to the initial recast of spreadsheet table 342 as 3-D table 400) as 3-D table 700, having one or more hidden vectors 748, to keep 3-D table 700 the same width (W) as the display area of GUI 440.

Figure 8:
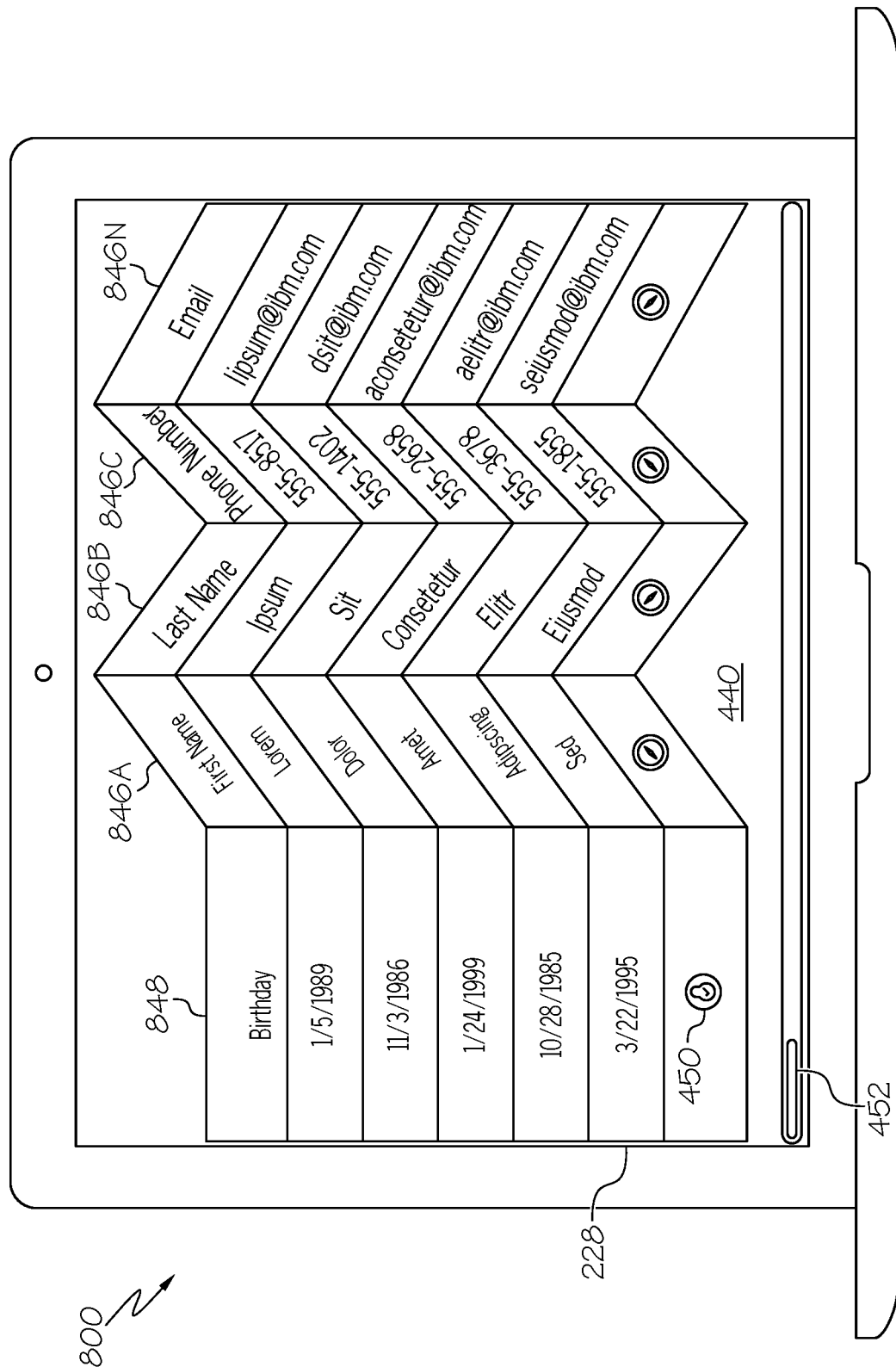
FIG. 8 shows an example of a 3-D table with a locked, non-corrugated vector according to illustrative embodiments.

Referring now to FIG. 8 in connection with FIG. 4, an illustrative example of 3-D table 800 with a locked, non-corrugated vector 848 is shown according to embodiments of the present invention. Generator 210 can also configure rotation manipulators 450 associated with vectors 446A-N of 3-D table 400 to lock a particular vector 446N (locked vector 848) front facing ($w_i$), such that the angle of rotation is zero ($\theta_i=0$). This locking of vector 848 can be in response to an occurrence, such as rotation control 224 receiving an indication that user 230 is interacting with rotation manipulators 450 in GUI 440 in such a way as to indicate that user 230 wants to lock vector 848 (e.g., a click in GUI 440 on rotation manipulator 450). Generator 210 can configure rotation control 224 to lock vector 848 in response to this signal. Generator 210 can also configure rotation control 224 to unlock locked vector 848 in response to an indication that user 230 wants to rotate vector 848 (e.g., a second click in GUI 440 on rotation manipulator 450). This process of locking vectors can be used to make content 444 of vector 848 more easily readable to user 230 compared to when vector 848 was tilted/rotated.

Similar to the illustrative example discussed above with reference to FIG. 6, in some embodiments, generator 210 can instruct or configure rotation control 224 to respond to changes to 3-D table 400, such as the locking of vector 848 by adjusting remaining vectors 846A-N (singular 846N). In some other embodiments, user interactions with rotation manipulators 450 are relayed by rotation control 224 to system 200, where these interactions are interpreted by rotator 204 of command receiver 202 as commands to adjust 3-D table 400. Similar to the process discussed above with reference to FIG. 6 and FIG. 7, rotation calculator 208 can, based on the information received by command receiver 202, calculate a new scaling ratio ($r_m'''$) by which to scale the existing actual vector widths ($m_i$) of vectors 846A-N with the following calculations:

$$r_m''' = \frac{W - \sum_{i=1}^{k} w_i}{\sum_{i=1}^{N} m_i},$$

$$m_i''' = m_i \cdot r_m''' (i = 1, 2, \ldots, N,)$$

$$\theta_i''' = \cos^{-1} \frac{m_i'}{w_i}$$

where there are k locked vectors 848 and a total of N other vectors 846A-N in 3-D table 800, the actual width of each locked vector 848 is $w_i$ (i=1, 2, ..., k) and the actual width of each other vector 846N is $m_i$ (i=1, 2, ..., N), and the width of the display area of GUI 440 is W, $m_i'''$ is the adjusted width of each vector 846A-N of 3-D table 800, and $\theta'''$ is the angle of rotation about axis $a_{i,i+1}$, i=0, 2, 4, ..., N of vectors 846A-N. Accordingly, from the results of these calculations, generator 210 can generate 3-D table 400 (using the same methodologies as described above with respect to the initial recast of spreadsheet table 342 as 3-D table 400) as 3-D table 800, having one or more locked vectors 848, to keep 3-D table 800 the same width (W) as the display area of GUI 440.

In some embodiments, system 200 can configure 3-D table 400 to always have at least one front facing ($w_i$, $\theta_i=0$) vector 848 when 3-D table 400 is rendered in GUI 440. More specifically, in some embodiments, generator 210 can tie slider 452 in GUI 440 to the at least one front-facing vector 848. The selection of which vector of vectors 464A-N is rendered as front-facing vector 848 can be in response to an occurrence, such as scroll control 226 receiving an indication that user 230 is interacting with slider 452 in GUI 440 through external device 14 in such a way as to indicate that user 230 wants to focus on a particular vector 446N and to view that particular vector as front-facing vector 848. Another such occurrence can be scroll control 226 receiving an indication that user 230 is interacting with cell 456 of a particular vector 446N in GUI 440 through external device 14 in such a way as to indicate that user 230 wants to focus on that particular cell 456 and to view that particular cell 456 as front-facing. Generator 210 can configure scroll control 226 to face front front-facing vector 848 in response to this signal. Generator 210 can also configure scroll control 226 to re-rotate front-facing vector 848 and front face a different vector of vectors 846A-N in response to an indication that user 230 wants to focus/front-face a different vector (e.g., moving slider 452 in GUI 440). This process of focusing vectors can be used to make content 444 of front-facing vector 848 more easily readable to user 230 compared to when vector 848 is tilted/rotated.

Generator 210 can instruct or configure scroll control 226 to respond to scrolling by user 230 in GUI 440 displaying 3-D table 800 by front-facing vector 848 and rotating remaining vectors 846A-N (singular 846N). In some other embodiments, user interactions with slider 452 are relayed by scroll control 226 to system 200, where these interactions are interpreted by scroller 206 of command receiver 202 as commands to render one vector of 3-D table 800 as front-facing and the remaining vectors as rotated. Rotation calculator 208 can, based on the information received by command receiver 202, calculate a scaling ratio (r') by which to scale the original widths of vectors 346A-N that have not been selected to face front. Scaling ratio (r') is calculated in the following manner:

$$r' = \frac{W - \sum_{i=1}^{k} w_{pi}}{\sum_{i=1}^{N} w_i - \sum_{i=1}^{k} w_{pi}}$$

where there are k locked vectors 848 ($p_1, p_2, \ldots, p_k$ and $k \geq 1$), there are N vectors 346A-N in table 342, the width of each vector is $w_i$ (i=1, 2, ..., N), and the width of the display area of GUI 440 is W. Rotation calculator 208 applies scaling ratio (r') to width ($w_i$) of each vector 346N that have not been selected to face front to find actual width ($m_i'$) of each vector 846N of 3-D table 800, such that:

$$m_i' = w_i \cdot r'(i=1,2,\ldots,N; i \neq p_1, p_2, \ldots, p_k; k \geq 1)$$

where $m_i'$ is the width of each non-front-facing vector 846N of 3-D table 800. The angle of rotation (θ) about axis ($a_{i,i+1}$) of vectors non-front-facing vector 846A-N can be calculated as:

$$\theta_i = \cos^{-1} \frac{m_i'}{w_i}$$

Accordingly, from the results of these calculations, generator 210 can generate 3-D table 800 (using the same methodologies as described above with respect to the initial recast of spreadsheet table 342 as 3-D table 400), having front-facing vectors 848, while making 3-D table 800 the same width (W) as the display area of GUI 440.

It should be understood that in some embodiments, generator 210 can also generate animation of 3-D table 800 to transition 3-D table 800 from a first rendering having a first front-facing vector 848 to a second rendering having a second, different front-facing vector 848. For example, generator 210 can use an animation tool to generate graphical depictions of 3-D table 800 in intermediate positions between the first and second rendering. In such embodiments, generator 210 can, for example, animate 3-D table 800 to show the first front-facing vector 848 rotating away from the horizontal ($\theta_1$ increases) while second front-facing vector 848 rotates towards the horizontal ($\theta_2$ decreases to zero). Generator 210 can also apply similar animation techniques to vector rotations in any of the 3-D tables 400, 600, 700, or 800 discussed above.

The methodologies discussed hereinabove permit generator 210 to generate a 3-D corrugated spreadsheet table in which rotation calculator 208 can dynamically calculate the angle of rotation (θ) of each vector 446N (or 646N, 746N, 846N) in response to interactions by user 230 through external device 14 with GUI 440 of spreadsheet tool 220. Such interactions may include rotating, hiding, and locking vectors 446A-N via rotation manipulator 450, as well as scrolling and front-facing/focusing vector 848 of vectors 846A-N via slider 452.

Figure 9:
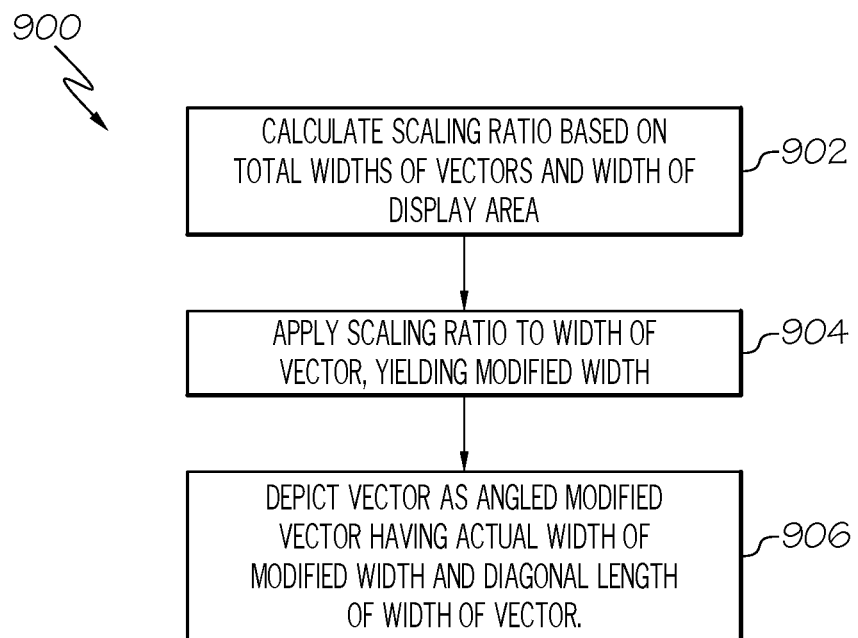
FIG. 9 shows a process flowchart for optimizing a display of tabular data according to illustrative embodiments.

As depicted in FIG. 9, in one embodiment, a system (e.g., computer system/server 12) carries out the methodologies disclosed herein. Shown is a process flowchart 900 for optimizing a display of tabular data from a two-dimensional (2-D) table as a folding three-dimensional (3-D) table having a plurality of vectors in a graphic user interface (GUI). At 902, rotation calculator 208 calculates a scaling ratio (r) based on a cumulative width $$\left( \sum_{i=1}^{N} w_i \right)$$

of a plurality of vectors 346A-N and a width (W) of a display area in GUI 440. At 904 rotation calculator 208 applies scaling ratio (r) to a width ($w_i$) of at least one vector 346N of plurality of vectors 346A-N to yield a modified width ($m_i$) of at least one vector 346N. At 906, generator 210 depicts at least one vector 346N as modified vector 446N angled between a horizontal and a vertical axis with respect to 2-D table 342, modified vector 446N having an actual width equal to the modified width ($m_i$) and a diagonal length equal to the width ($w_i$) of at least one vector 346.

Process flowchart 900 of FIG. 9 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a display of tabular data. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a display of tabular data. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimize a display of tabular data. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a display of tabular data from a two-dimensional (2-D) table as a folding three-dimensional (3-D) table having a plurality of vectors in a graphic user interface (GUI), the method comprising:
   calculating a scaling ratio based on a cumulative width of the plurality of vectors and a width of a display area in the GUI;
   determining a maximum angle of rotation for at least one vector of the plurality of vectors based on legibility of content contained in the at least one vector;
   determining a modified width of the at least one vector by applying the scaling ratio to a width of the at least one vector;
   calculating a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and
   adjusting a rotation of at least one vector of the plurality of vectors in the case that the proposed angle of rotation for the at least one vector exceeds the maximum angle of rotation for the at least one vector.

2. The method of claim 1, the method further comprising:
   applying, in the case that, for each vector, a proposed angle of rotation for the vector does not exceed a maximum angle of rotation for the vector, the scaling ratio to a width of each vector of the plurality of vectors to yield a plurality of modified widths, each associated with one vector of the plurality of vectors, a cumulative width of the modified widths being equal to the width of the display area in the GUI; and
   depicting, for each vector of the plurality of vectors, the vector as a modified vector angled between a horizontal and a vertical axis with respect to the 2-D table.

3. The method of claim 2, the method further comprising:
   receiving a request to modify the angle between the horizontal and the vertical axis with respect to the 2-D table of a first modified vector, of the plurality of modified vectors, to a second angle;
   calculating a second modified width of the first modified vector based on the second angle;
   calculating a second scaling ratio based on the cumulative width of the plurality of modified vectors save the first modified vector, the width of the display area in the GUI, and the second modified width;
   applying, for each modified vector save the first modified vector, the second scaling ratio to the modified width of the modified vector to yield a third modified width, a cumulative width of the third modified widths and the second modified width being equal to the width of the display area in the GUI;
   depicting the first modified vector as a second modified vector angled between the horizontal and the vertical axis with respect to the 2-D table, the second modified vector having an actual width equal to the second modified width associated with the first modified vector and a diagonal length equal to the width of the vector associated with the first modified vector; and
   depicting, for each modified vector save the first modified vector, the modified vector as a third modified vector angled between the horizontal and the vertical axis with respect to the 2-D table, the third modified vector having an actual width equal to the third modified width associated with the modified vector and a diagonal length equal to the width of the vector associated with the modified vector.

4. The method of claim 2, the method further comprising:
receiving a request to hide a modified vector of the plurality of modified vectors;
calculating a second scaling ratio based on the cumulative width of the plurality of modified vectors save the modified vector to be hidden and the width of the display area in the GUI;
applying, for each modified vector save the modified vector to be hidden, the second scaling ratio to the modified width of the modified vector to yield a second modified width, a cumulative width of the second modified widths being equal to the width of the display area in the GUI; and
not depicting the modified vector to be hidden, while depicting, for each modified vector save the hidden modified vector, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

5. The method of claim 2, the method further comprising:
receiving a request to lock a first modified vector, of the plurality of modified vectors, as front-facing;
calculating a second scaling ratio based on the cumulative width of the plurality of modified vectors save the modified vector to be locked, the width of the display area in the GUI, and the width of the vector of the 2-D table associated with the modified vector to be locked front-facing;
applying, for each modified vector save the modified vector to be locked, the second scaling ratio to the modified width of the modified vector to yield a second modified width, a cumulative width of the second modified widths and the width of the vector of the 2-D table associated with the modified vector to be locked front-facing being equal to the width of the display area in the GUI;
depicting the modified vector to be locked as the vector of the 2-D table associated with the modified vector to be locked; and
depicting, for each modified vector save the modified vector to be locked, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

6. The method of claim 1, the calculating the scaling ratio being further based on a width of a first vector, the method further comprising:
selecting the first vector as a normal vector with a face coplanar to a horizontal and a vertical axis with respect to the 2-D table;
applying the scaling ratio to a width of each vector, save the first vector, of the plurality of vectors to yield a plurality of modified widths, each associated with one vector of the plurality of vectors, save the first vector, a cumulative width of the modified widths and the first vector being equal to the width of the display area in the GUI;
depicting the first vector as the normal vector;
depicting, for each vector of the plurality of vectors save the first vector, the vector as a modified vector angled between the horizontal and the vertical axis with respect to the 2-D table, the modified vector having an actual width equal to the modified width associated with the vector and a diagonal length equal to the width of the vector;
selecting a second vector as a normal vector with a face coplanar to a horizontal and a vertical axis with respect to the 2-D table;
applying the scaling ratio to a width of each vector, save the second vector, of the plurality of vectors to yield a plurality of modified widths, each associated with one vector of the plurality of vectors, save the second vector, a cumulative width of the modified widths and the second vector being equal to the width of the display area in the GUI;
depicting the second vector as the normal vector; and
depicting, for each vector of the plurality of vectors save the second vector, the vector as a modified vector angled between the horizontal and the vertical axis with respect to the 2-D table, the modified vector having an actual width equal to the modified width associated with the vector and a diagonal length equal to the width of the vector.

7. The method of claim 1, the method further comprising hiding the content of the at least one vector in the case that the angle of rotation of the at least one vector exceeds the maximum angle of rotation for the at least one vector and no other vector of the plurality of vectors can be further rotated.

8. A computer system for optimizing a display of tabular data from a two-dimensional (2-D) table as a folding three-dimensional (3-D) table having a plurality of vectors in a graphic user interface (GUI), the computer system comprising:
a memory medium comprising program instructions;
a bus coupled to the memory medium; and
a processor, for executing the program instructions, coupled to a tabular data display optimization engine via the bus that when executing the program instructions causes the system to:
calculate a scaling ratio based on a cumulative width of the plurality of vectors and a width of a display area in the GUI;
determine a maximum angle of rotation for at least one vector of the plurality of vectors based on legibility of content contained in the at least one vector;
determine a modified width of the at least one vector by applying the scaling ratio to a width of the at least one vector;
calculate a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and
adjust a rotation of at least one vector of the plurality of vectors in the case that the proposed angle of rotation for the at least one vector exceeds the maximum angle of rotation for the at least one vector.

9. The computer system of claim 8, the instructions further causing the system to:
apply, in the case that, for each vector, a proposed angle of rotation for the vector does not exceed a maximum angle of rotation for the vector, the scaling ratio to a width of each vector of the plurality of vectors to yield a plurality of modified widths, each associated with one vector of the plurality of vectors, a cumulative width of the modified widths being equal to the width of the display area in the GUI; and
depict, for each vector of the plurality of vectors, the vector as a modified vector angled between a horizontal and a vertical axis with respect to the 2-D table.

10. The computer system of claim 9, the instructions further causing the system to:
receive a request to modify the angle between the horizontal and the vertical axis with respect to the 2-D table of a first modified vector, of the plurality of modified vectors, to a second angle;
calculate a second modified width of the first modified vector based on the second angle;
calculate a second scaling ratio based on the cumulative width of the plurality of modified vectors save the first modified vector, the width of the display area in the GUI, and the second modified width;
apply, for each modified vector save the first modified vector, the second scaling ratio to the modified width of the modified vector to yield a third modified width, a cumulative width of the third modified widths and the second modified width being equal to the width of the display area in the GUI;
depict the first modified vector as a second modified vector angled between the horizontal and the vertical axis with respect to the 2-D table, the second modified vector having an actual width equal to the second modified width associated with the first modified vector and a diagonal length equal to the width of the vector associated with the first modified vector; and
depict, for each modified vector save the first modified vector, the modified vector as a third modified vector angled between the horizontal and the vertical axis with respect to the 2-D table, the third modified vector having an actual width equal to the third modified width associated with the modified vector and a diagonal length equal to the width of the vector associated with the modified vector.

11. The computer system of claim 9, the instructions further causing the system to:
receive a request to hide a modified vector of the plurality of modified vectors;
calculate a second scaling ratio based on the cumulative width of the plurality of modified vectors save the modified vector to be hidden and the width of the display area in the GUI;
apply, for each modified vector save the modified vector to be hidden, the second scaling ratio to the modified width of the modified vector to yield a second modified width, a cumulative width of the second modified widths being equal to the width of the display area in the GUI; and
not depict the modified vector to be hidden, while depicting, for each modified vector save the hidden modified vector, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

12. The computer system of claim 9, the instructions further causing the system to:
receive a request to lock a first modified vector, of the plurality of modified vectors, as front-facing;
calculate a second scaling ratio based on the cumulative width of the plurality of modified vectors save the modified vector to be locked, the width of the display area in the GUI, and the width of the vector of the 2-D table associated with the modified vector to be locked front-facing;
apply, for each modified vector save the modified vector to be locked, the second scaling ratio to the modified width of the modified vector to yield a second modified width, a cumulative width of the second modified widths and the width of the vector of the 2-D table associated with the modified vector to be locked front-facing being equal to the width of the display area in the GUI;
depict the modified vector to be locked as the vector of the 2-D table associated with the modified vector to be locked; and
depict, for each modified vector save the modified vector to be locked, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

13. The computer system of claim 8, the instructions further causing the system to:
calculate the scaling ratio based on a width of a first vector;
select the first vector as a normal vector with a face coplanar to a horizontal and a vertical axis with respect to the 2-D table;
apply the scaling ratio to a width of each vector, save the first vector, of the plurality of vectors to yield a plurality of modified widths, each associated with one vector of the plurality of vectors, save the first vector, a cumulative width of the modified widths and the first vector being equal to the width of the display area in the GUI;
depict the first vector as the normal vector;
depict, for each vector of the plurality of vectors save the first vector, the vector as a modified vector angled between the horizontal and the vertical axis with respect to the 2-D table, the modified vector having an actual width equal to the modified width associated with the vector and a diagonal length equal to the width of the vector;
select a second vector as a normal vector with a face coplanar to a horizontal and a vertical axis with respect to the 2-D table;
apply the scaling ratio to a width of each vector, save the second vector, of the plurality of vectors to yield a plurality of modified widths, each associated with one vector of the plurality of vectors, save the second vector, a cumulative width of the modified widths and the second vector being equal to the width of the display area in the GUI;
depict the second vector as the normal vector; and depict, for each vector of the plurality of vectors save the second vector, the vector as a modified vector angled between the horizontal and the vertical axis with respect to the 2-D table, the modified vector having an actual width equal to the modified width associated with the vector and a diagonal length equal to the width of the vector.

14. The computer system of claim 8, the instructions further causing the system to hide the content of the at least one vector in the case that the angle of rotation of the at least one vector exceeds the maximum angle of rotation for the at least one vector and no other vector of the plurality of vectors can be further rotated.

15. A computer program product for optimizing a display of tabular data from a two-dimensional (2-D) table as a folding three-dimensional (3-D) table having a plurality of vectors in a graphic user interface (GUI), the computer program product comprising a computer readable hardware storage device, and program instructions stored on the computer readable hardware storage device, to:
    calculate a scaling ratio based on a cumulative width of the plurality of vectors and a width of a display area in the GUI;
    determine a maximum angle of rotation for at least one vector of the plurality of vectors based on legibility of content contained in the at least one vector;
    determine modified width of the at least one vector by applying the scaling ratio to a width of the at least one vector;
    calculate a proposed angle of rotation for the at least one vector of the plurality of vectors that, if applied to the at least one vector, would allow the at least one vector to be depicted as a modified vector angled between a horizontal and a vertical axis with respect to the 2-D table, the modified vector having an actual width equal to the modified width and a diagonal length equal to the width of the at least one vector; and
    adjust a rotation of at least one vector of the plurality of vectors in the case that the proposed angle of rotation for the at least one vector exceeds the maximum angle of rotation for the at least one vector.

16. The computer program product of claim 15, the computer readable storage device further comprising instructions to:
    apply, in the case that, for each vector, a proposed angle of rotation for the vector does not exceed a maximum angle of rotation for the vector, the scaling ratio to a width of each vector of the plurality of vectors to yield a plurality of modified widths, each associated with one vector of the plurality of vectors, a cumulative width of the modified widths being equal to the width of the display area in the GUI; and
    depict, for each vector of the plurality of vectors, the vector as a modified vector angled between a horizontal and a vertical axis with respect to the 2-D table.

17. The computer program product of claim 16, the computer readable storage device further comprising instructions to:
    receive a request to modify the angle between the horizontal and the vertical axis with respect to the 2-D table of a first modified vector, of the plurality of modified vectors, to a second angle;
    calculate a second modified width of the first modified vector based on the second angle;
    calculate a second scaling ratio based on the cumulative width of the plurality of modified vectors save the first modified vector, the width of the display area in the GUI, and the second modified width;
    apply, for each modified vector save the first modified vector, the second scaling ratio to the modified width of the modified vector to yield a third modified width, a cumulative width of the third modified widths and the second modified width being equal to the width of the display area in the GUI;
    depict the first modified vector as a second modified vector angled between the horizontal and the vertical axis with respect to the 2-D table, the second modified vector having an actual width equal to the second modified width associated with the first modified vector and a diagonal length equal to the width of the vector associated with the first modified vector; and
    depict, for each modified vector save the first modified vector, the modified vector as a third modified vector angled between the horizontal and the vertical axis with respect to the 2-D table, the third modified vector having an actual width equal to the third modified width associated with the modified vector and a diagonal length equal to the width of the vector associated with the modified vector.

18. The computer program product of claim 16, the computer readable storage device further comprising instructions to:
    receive a request to hide a modified vector of the plurality of modified vectors;
    calculate a second scaling ratio based on the cumulative width of the plurality of modified vectors save the modified vector to be hidden and the width of the display area in the GUI;
    apply, for each modified vector save the modified vector to be hidden, the second scaling ratio to the modified width of the modified vector to yield a second modified width, a cumulative width of the second modified widths being equal to the width of the display area in the GUI; and
    not depict the modified vector to be hidden, while depicting, for each modified vector save the hidden modified vector, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

19. The computer program product of claim 16, the computer readable storage device further comprising instructions to:
    receive a request to lock a first modified vector, of the plurality of modified vectors, as front-facing;
    calculate a second scaling ratio based on the cumulative width of the plurality of modified vectors save the modified vector to be locked, the width of the display area in the GUI, and the width of the vector of the 2-D table associated with the modified vector to be locked front-facing;
    apply, for each modified vector save the modified vector to be locked, the second scaling ratio to the modified width of the modified vector to yield a second modified width, a cumulative width of the second modified widths and the width of the vector of the 2-D table associated with the modified vector to be locked front-facing being equal to the width of the display area in the GUI;

depict the modified vector to be locked as the vector of the 2-D table associated with the modified vector to be locked; and depict, for each modified vector save the modified vector to be locked, the modified vector as a second modified vector angled between the horizontal and the vertical axis with respect to the 2-D table, the second modified vector having an actual width equal to the second modified width associated with the modified vector and a diagonal length equal to the width of the vector associated with the modified vector.

20. The computer program product of claim 15, the computer readable storage device further comprising instructions to:

calculate the scaling ratio based on a width of a first vector;

select the first vector as a normal vector with a face coplanar to a horizontal and a vertical axis with respect to the 2-D table;

apply the scaling ratio to a width of each vector, save the first vector, of the plurality of vectors to yield a plurality of modified widths, each associated with one vector of the plurality of vectors, save the first vector, a cumulative width of the modified widths and the first vector being equal to the width of the display area in the GUI;

depict the first vector as the normal vector;

depict, for each vector of the plurality of vectors save the first vector, the vector as a modified vector angled between the horizontal and the vertical axis with respect to the 2-D table, the modified vector having an actual width equal to the modified width associated with the vector and a diagonal length equal to the width of the vector;

select a second vector as a normal vector with a face coplanar to a horizontal and a vertical axis with respect to the 2-D table;

apply the scaling ratio to a width of each vector, save the second vector, of the plurality of vectors to yield a plurality of modified widths, each associated with one vector of the plurality of vectors, save the second vector, a cumulative width of the modified widths and the second vector being equal to the width of the display area in the GUI;

depict the second vector as the normal vector; and depict, for each vector of the plurality of vectors save the second vector, the vector as a modified vector angled between the horizontal and the vertical axis with respect to the 2-D table, the modified vector having an actual width equal to the modified width associated with the vector and a diagonal length equal to the width of the vector.

* * * * *